Patented Dec. 3, 1929

1,737,775

UNITED STATES PATENT OFFICE

LEE T. SMITH, OF KENVIL, NEW JERSEY, ASSIGNOR TO HERCULES POWDER COMPANY, OF WILMINGTON, DELAWARE, A CORPORATION OF DELAWARE

METHOD OF RECLAIMING RUBBER FROM SCRAP

No Drawing. Application filed June 14, 1927. Serial No. 198,868.

My invention relates to a method for reclaiming rubber from scrap by which an improved grade of reclamed rubber will be obtained.

Heretofore rubber has been reclaimed from scrap, such as used automobile tire casings, inner tubes, rubber shoes, solid tires, rubberized or rubber coated fabric and various other articles by treatment of the scrap with an alkali, or with an acid in the presence of heat in a devulcanizer. The digested stock is subsequently washed and dried, foreign matter removed by screening and finally passed through sheeting rolls.

Rubber reclaimed by the processes heretofore practiced is not of an entirely desirable character in that when it is vulcanized the product is inferior in tensile strength, elongation and resiliency, and the fabric, with which the rubber is associated in the scrap, is destroyed.

Now, it is the object of my invention to provide a method of reclaiming rubber by which the rubber reclaimed will compare favorably in physical characteristics with unvulcanized rubber and by which, if desired, the fabric may be reclaimed as well as the rubber.

In accordance with my invention, I utilize for the reclaiming of rubber a pine derivative, which I will refer to a dipolymer and which in accordance with my invention may be used alone or in connection with the well known alkali process or the well known acid process for the reclaiming of rubber, as well as with such softeners as mineral or vegetable oil. The dipolymer may be used in quantity from 0.01 to 1.0 part rubber.

Dipolymer may be defined broadly as a pine product the major portion of which boils above 225° C. and more particularly as a pine product comprising polymerized terpene hydrocarbons. Dipolymer is composed largely of the polymer $(C_{10}H_{16})_2$ with a substantial proportion of higher polymers $(C_{10}H_{16})_n$. Dipolymer has a specific gravity range from 0.93–0.97 and a boiling range by the American Society for Testing Materials method from 225° C.–375° C., or approximately as follows: 5% over at 225° C., 10%—250° C., 20%—300° C., 50%—325° C., 60%—330° C., 70%—335° C., 80%—340° C., 90%—350° C., and 95%—375° C.

Dipolymer may be prepared, for example, by polymerization, with heat and a catalyst, of pine oil, as for example, disclosed in United States Letters Patent to Irvin W. Humphrey, No.1,691,573, November 13, 1928, and No. 1,691,069, February 13, 1928, or dipolymer may be prepared by the polymerization of the product of the distillation, or extraction, of pine wood which boils within about the range 160° C.–200° C., as for example, disclosed in United States Letters Patent to Irvin W. Humphrey, No. 1,691,067, November 13, 1928, and No. 1,691,068, November 13, 1928.

In carrying out the method according to my invention as has been indicated, the dipolymer may be used alone or in connection with the well known alkali or the well known acid process, as well as with other softeners as mineral or vegetable oils.

As an example of the carrying out of my method where the alkali or acid process is used, the scrap rubber is cracked, broken or cut into pieces, say one inch or less in size, which are placed in an autoclave or devulcanizer along with water and an alkali, as caustic soda, say 5%–15% by weight of rubber, in a 20% caustic soda solution (alkali process), or a mineral acid, in amount sufficient to destroy the fabric and of a concentration low enough, say about 20%, so as not to attack the rubber, (acid process), and dipolymer in quantity is added from say 2% to 15% of the rubber. Steam at, say from 125–200 pounds pressure, is then applied for, say 6–24 hours. After this treatment, the digested stock is discharged into a washing machine, where the dirt and alkali or acid is washed out, and then run into a squeezing machine where it is freed from excess water. The stock is then dried by circulating hot air, or by heating under vacuum, and then warmed up by passing it through heated rolls. Foreign matter, as metallic substances, unchanged rubber, sticks, etc., are then removed in the usual manner, as by passing thru a strainer, and the finished product passed through sheeting rolls where it is molded into sheets of the desired width and thickness.

When the dipolymer is used alone, it may, for example, be added to the scrap rubber, broken or cut into small pieces, in the proportion of, say from one to ten parts of dipolymer to one part of rubber. The dipolymer, which is an excellent solvent for rubber, whether vulcanized or unvulcanized, will dissolve the rubber from the fabric. The rubber dissolved in the dipolymer may be recovered from the solution by treatment with a selective solvent for the dipolymer which is miscible with dipolymer and non solvent of rubber, such as an alcohol, acetone, or an operative equivalent thereof, which will cause precipitation of the rubber and enable its ready recovery. The fabric which is unaffected by the dipolymer may be filtered out from the rubber solution, preferably before precipitation of the rubber and re-used. The precipitated rubber may be separated from the dipolymer by filtration. The dipolymer and selective solvent may be separated for re-use by distillation. The recovered rubber is then passed through sheeting rolls for molding into sheets of desired dimensions. Some dipolymer will remain with the rubber and will act as a softener; however, if it is desired to completely remove the dipolymer such may be accomplished by dissolving the dipolymer from the rubber with, for example, acetone and separating the alcohol and dipolymer by distillation.

When dipolymer is used, it acts as a devulcanizer and softener to a superior degree and small amounts, say 1%-2% may be advantageously left in the reclaimed rubber, in wihch case it will act as a softener. When dipolymer is used alone in the reclaiming of rubber, it acts as a solvent for the rubber and enables the reclamation of the fabric as well as the rubber from scrap.

Rubber reclaimed with the use of dipolymer according to my invention results in the production of a reclaimed rubber which, when vulcanized yields a product having tensile strength, elongation and resiliency comparable with that of raw rubber, which has been vulcanized and greatly superior to that heretofore produced from reclaimed rubber.

It will be understood that in accordance with my invention the dipolymer may be utilized alone or in connection with the well known acid or alkali processes and that when in the claims appended hereto I specify the alkali process, I intend to include the acid process as an equivalent.

Having now fully described my invention, what I claim and desire to protect by Letters Patent is:

1. The method of reclaiming rubber from scrap, which includes treating the scrap with dipolymer.

2. The method of reclaiming rubber from scrap, which includes subjecting the scrap to a treatment for the recovery of the rubber and at the same time subjecting the rubber to treatment with dipolymer.

3. The method of reclaiming rubber from scrap, which includes subjecting the scrap to a treatment for the recovery of the rubber and at the same time subjecting the rubber to treatment with dipolymer in quantity from 0.5% to 15.0% of rubber.

4. The method of reclaiming rubber from scrap, which includes subjecting the scrap to a treatment by the alkali process for the recovery of the rubber and at the same time subjecting the rubber to treatment with dipolymer.

5. The method of reclaiming rubber from scrap, which includes dissolving the rubber from the fabric of the scrap by treatment of the scrap with dipolymer, treating the dipolymer-rubber solution with a selective solvent for the dipolymer to effect precipitation of the rubber from the solution and recovering the precipitated rubber.

6. The method of reclaiming rubber from scrap, which includes dissolving the rubber from the fabric of the scrap by treatment of the scrap with dipolymer, treating the dipolymer-rubber solution with an acetone to effect precipitation of the rubber from the solution and recovering the precipitated rubber.

In testimony of which invention, I have hereunto set my hand at Kenvil, New Jersey, on this 9th day of June, 1927.

LEE T. SMITH.